US008447975B2

(12) United States Patent
Botzum et al.

(10) Patent No.: US 8,447,975 B2
(45) Date of Patent: May 21, 2013

(54) WORKSTATION APPLICATION SERVER PROGRAMMING PROTECTION VIA CLASSLOADER POLICY BASED VISIBILITY CONTROL

(75) Inventors: Keys D. Botzum, Columbia, MD (US); Ching-Yun Chao, Austin, TX (US); Glyn Normington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 11/176,813

(22) Filed: Jul. 7, 2005

(65) Prior Publication Data

US 2007/0011451 A1  Jan. 11, 2007

(51) Int. Cl.
*G06F 21/00* (2006.01)
(52) U.S. Cl.
USPC .......................................................... 713/166
(58) Field of Classification Search
USPC .... 707/1, 2, 10, 101, 103, 104, 200; 395/188, 395/186, 761; 726/1; 713/166
See application file for complete search history.

(56) References Cited

U.S. PATENT DOCUMENTS

| 5,737,619 | A | * | 4/1998 | Judson ............................ 715/236 |
| 5,991,519 | A | * | 11/1999 | Benhammou et al. ......... 395/188 |
| 6,609,128 | B1 | * | 8/2003 | Underwood ..................... 707/10 |
| 7,389,514 | B2 | * | 6/2008 | Russell et al. ................. 719/315 |
| 7,490,347 | B1 | * | 2/2009 | Schneider et al. ................. 726/2 |
| 2001/0034814 | A1 | * | 10/2001 | Rosenzweig ................. 711/118 |

OTHER PUBLICATIONS

Micha Meier, Monday Mar. 4, 1996, The Module Interface.*

* cited by examiner

*Primary Examiner* — Brandon Hoffman
*Assistant Examiner* — Anthony Brown
(74) *Attorney, Agent, or Firm* — Matthews B. Talpis; Gregory K Goshorn; Greg Goshorn, P.C.

(57) ABSTRACT

Provided is a method for providing Java modularity class loader protection by controlling the visibility of WebSphere, service provider, library and utility code interfaces. Interface access authorization is checked once, during module and class loading to effectively protect vulnerable programming interfaces, eliminating permission checking during execution. Code in a WebSphere Application server (WAS) computing environment is categorized into a finite number of sets in which one permission type is assigned to each set and the code in each set runs at the same privilege zone. Each set exposes programming interfaces to provide functional service and code in a particular set can only access code in the same or a lower security zone set. Also provided is a technique for explicitly providing to specific modules in lower security zones access to modules or designated interfaces of modules in higher security zones.

17 Claims, 6 Drawing Sheets

WORKSTATION APPLICATION SERVER PROGRAMMING PROTECTION VIA CLASSLOADER POLICY BASED VISIBILITY CONTROL

TECHNICAL FIELD

The present invention relates generally to computer security and, more specifically, to improving performance without compromising security protection mechanisms.

BACKGROUND OF THE INVENTION

With the advent of the Internet, sometimes referred to as the "web," businesses and consumers have multiple means of communication not previously available, including, but not limited to, business-to-business (B2B) and business-to-consumer (B2C) links. As businesses seek to take advantage of the web, some companies have provided specific applications, called "e-business" applications, that work in that particular environment. In addition, companies, such as International Business Machines Corporation (IBM) of Armonk, N.Y., have developed products that facilitate the deployment, integration, execution and management of e-business applications. One such IBM product is "WebSphere," which encompasses tools for developing e-business applications and middleware for running web-based applications. One part of WebSphere is a WebSphere Application Server (WAS), which is a run-time component of the WebSphere family of products. Basically, WAS is a Java process with a Java Virtual Machine (JVM).

Currently, WAS uses a Java2 security model to ensure the integrity of applications and the WebSphere runtime environment. There are two closely related problems with the Java2 security in WAS. First, Java2 imposes a significant runtime performance penalty; and, second, the process for defining precise security permissions is cumbersome. For, example, permission checking associated with these two issues imposes a twenty-two percent (22%) performance overhead running a version of "Trade3" benchmark Jave2 Platform Enterprise Edition (J2EE) application.

The Java Versioning and Modularity working group have proposed a modular approach to enhance WAS versioning and release-to-release compatibility management. The basic approach is to group Java archives (JARs) into modules with explicitly defined interfaces among modules. Each module exposes public interfaces with an explicit "EXPORT" definition. Each module also declares dependencies on other modules with an explicit "IMPORT" definition. This modular approach is in conformity with the OSGi Specifications.

Java2 security employs permission checking to enforce the access control policy. Under the standard Java2 implementation, permission checking is performed every time an interface is accessed during runtime. This is the primary source of the performance penalties of the standard Java2 security. The J2EE runtime environment default Java2 security policy allows J2EE applications a very limited set of permissions to ensure runtime integrity. When a J2EE application is deployed to a WAS runtime environment, an information technology (IT) administrator is prompted to take necessary actions if that application requires additional permissions. To determine whether additional permissions can be granted to the application requires that IT administrators have a good understanding of the implications of granting particular permissions to the application.

What is needed is a method of security protection that does not have an inverse impact on performance, i.e. does not impose the typical Java2 runtime performance penalty, and does not require a user to set a wide variety of permission settings for every class or module.

SUMMARY OF THE INVENTION

Provided is a method for providing Java modularity class loader protection by controlling the visibility of WebSphere, service provider, library and utility code interfaces. Interface access authorization is checked once, during class loading to effectively protect vulnerable programming interfaces. Unlike typical Java protection, which executes permission checking every time an interface is accessed, the disclosed method does not impose runtime performance penalties.

The claimed subject matter applies and extends the Java Modularity work, using a new approach to ensure runtime integrity with less performance overhead and ease the policy management burden on IT administrators. The claimed subject matter is not a replacement of Java2 security model. It is a complimentary technology designed to protect programming interfaces.

In the claimed subject matter, the code in the WAS computing environment is categorized into a finite number of sets and the code in each set runs at the same privilege level. Instead of using the standard Java2 fine grained permission types which are very hard to manage, the number of permission types is reduced by assigning one permission type to each set.

The code in an exemplary WAS computing environment described below is categorized into four sets, or zones: trusted, service-provider, privileged, and standard, with decreasing level of privilege. Each set typically exposes programming interfaces to provide functional service. A method in a particular programming interface that manipulates sensitive data is considered to be a security sensitive method that needs to be protected. The typical way to protect a sensitive method using Java2 Security is to require users of that method, i.e. other code or modules, to have appropriate permissions and for the method to perform permission checking every time the method is executed. In this manner, only authorized code can access the protected method.

As explained above, a server runtime environment supports security zones, each zone with a corresponding privilege level. In the described embodiment, different zones include a trusted code, or zone, a service provider/utility/library (SP) zone, a privileged zone and a standard, or application zone. Applications are typically assigned to either the privileged zone or, by default, to the standard zone. In the following example, an Operating System (OS) and a Java Virtual Machine (JVM) are not defined as zones but rather are the platform on which the claimed subject matter is implemented. In another embodiment, the OS and JVM may be defined as zones with the OS as the highest security zone and the JVM as the next highest security zone.

In the described embodiment, the trusted zone is the highest zone, which gives code in the trusted zone access to any code or modules in the trusted or any other zone provided that the accessed code has visibility to the trusted zone code as far as class loader is concerned. Note that programming interface protection is closely related to class loader policy. An interface can be accessed if both the security policy allows such access and the class is visible according to the class loader policy. The SP zone is the next highest, which implies that code in the SP zone by default has access to any SP zone code or modules and any code or modules in lower security zones. SP zone modules are able to access trusted zone modules only when explicitly provided access. In a similar fashion, modules in the privileged zone, the next highest zone, by default have access to any privileged zone code or modules and any code or modules in lower security zones. Privileged zone modules are able to access trusted zone and SP zone modules only when explicitly provided access. Modules in the standard zone by default only have access to other modules in the standard zone. Standard zone modules are able to access trusted zone, SP zone and privileged zone modules only when explicitly provided access.

Also provided is a technique for explicitly providing to specific modules in lower security zones access to modules or designated interfaces of modules in higher security zones.

BRIEF DESCRIPTION OF THE DRAWINGS

A better understanding of the present invention can be obtained when the following detailed description of the disclosed embodiments is considered in conjunction with the following drawings.

DETAILED DESCRIPTION OF THE FIGURES

Although described with particular reference to a Java runtime environment, the claimed subject matter can be implemented in any server architecture in which interface security is an issue. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for providing Java modularity class loader protection by controlling the visibility of WebSphere, service provider, library and utility code interfaces. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
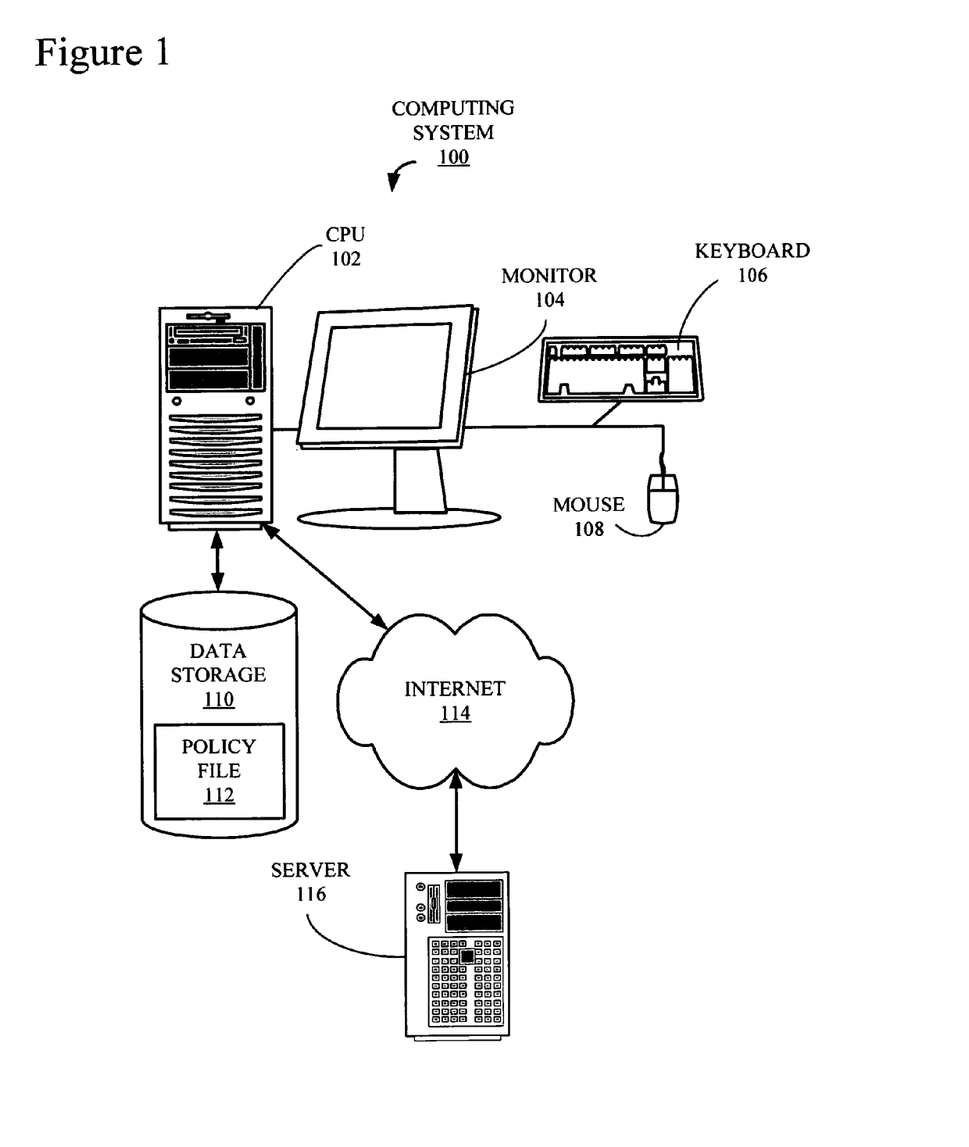
FIG. 1 is a block diagram of an exemplary computing system that employs the claimed subject matter.

Turning now to the figures, FIG. 1 is a block diagram of an exemplary computing system architecture 100 that incorporates the claimed subject matter. A central processing unit (CPU) 102 is coupled to a monitor 104, a keyboard 106 and a mouse 108, which together facilitate human interaction with computing system 100. Attached to CPU 102 is a data storage component 110, which may either be incorporated into CPU 102 i.e. an internal device, or attached externally to CPU 102 by means of various, commonly available connection devices such as but not limited to, a universal serial bus (USB) port (not shown). Data storage 110 is illustrated containing a policy file 112, which is described in more detail below in conjunction with FIGS. 3-6.

CPU 102 is connected to the Internet 114, which is also connected to a server computer 116. Although in this example, CPU 102 and server 116 are communicatively coupled via the Internet, they could also be coupled through any number of communication mediums such as, but not limited to, a local area network (LAN) (not shown).

Figure 2:
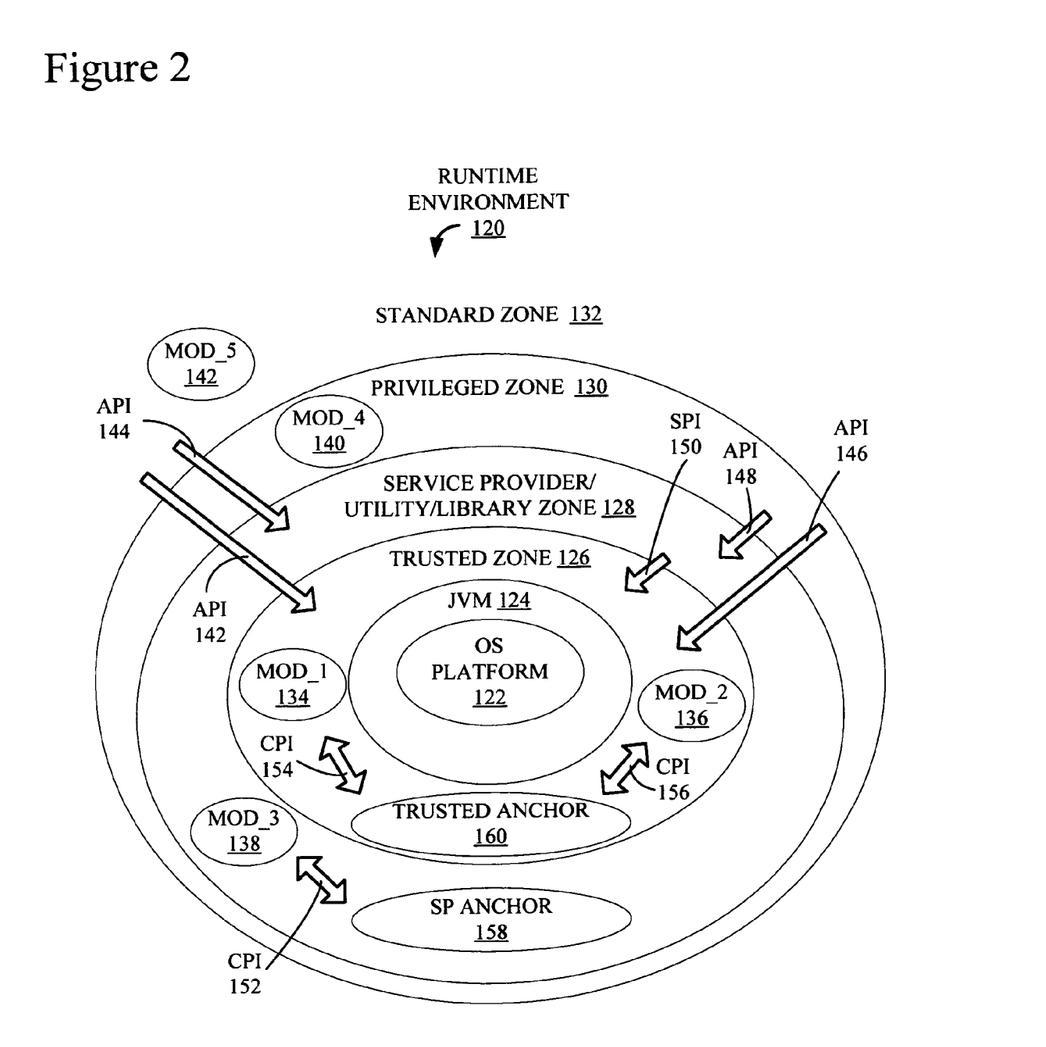
FIG. 2 is an illustration of computing runtime environment, executing on the computing system of FIG. 1, categorized into security sets, or zones, according to the claimed subject matter.

FIG. 2 is an illustration of computing runtime environment 120, executing on CPU 102 and/or server 116 of computing system 100 of FIG. 1. Runtime environment 120 includes an operating system, or platform, (OS) 122. OS 122 may be any available operating system such as, but not limited to, Windows, published by the Microsoft Corporation of Redmond, Wash., AIX, published by International Business Machines Corporation (IBM) of Armonk, N.Y., and Linux, which is a commonly available, open-source OS.

Executing in conjunction with OS 122 is a Java Virtual Machine (JVM) 124. Java is a high-level programming language published by Sun Microsystems, Inc. of Santa Clara, Calif. JVM 124 is a runtime engine that executes Java code. In the following examples, the claimed subject matter is described in relation to Java code, the Java Runtime Environment (JVE) and JVM 124 although those with skill in the programming arts should appreciate that the claimed subject matter is applicable to a wide variety of computing environments.

According to the claimed subject matter, run-time environment 120 is compartmentalized into security sets, or zones. In this example, the security zones include a trusted zone 126, a service provider/utility/library (SP) zone 128, a privileged zone 130 and a standard zone 132. The closer a particular zone is to OS 122 and JVM 124 the higher the security level. In other words, trusted zone 126 is a higher security level than SP zone 128, SP zone 128 is a higher security level than privileged zone 130; and privileged zone 132 is a higher security level than standard zone 132. In addition, the relationships among the zones 126, 128, 130 and 132 is transitive, i.e. trusted zone 126 is a higher security level than privileged zone 130 and standard zone 132 in addition to SP zone 128. In this example, standard zone 132 lies outside of OS 122, JVM 124 and all security zones 126, 128 and 130. In other words, standard zone 132 is the lowest security level and serves as a default security level for any code or module that has not been designated to be within any other zone 126, 128 or 130.

A higher security level implies that the corresponding logic needs a higher degree of protection from both inadvertent access and deliberate attempts to compromise the integrity of the particular level, or zone. Of course, although not defined in the following example as security zones, OS 122 and JVM 124 also require high levels of security. In an alternative embodiment OS 122 and JVM 124 could be defined as security zones, in which case OS 122 may be the highest security zone and JVM 124 the second highest.

In model 120, modules in higher zones may access any module in the same or lower zones. For example, any module in trusted zone 126 can access interfaces to modules in trusted zone 126, SP zone 128, privileged zone 130 and standard zone 132. Modules in SP zone 128 can access interfaces of other modules in SP zone 128, privileged zone 130 and standard zone 132, but requires specific authorization to access any interfaces of modules in trusted zone 126. Any module of privileged zone 130 is able to access interfaces for other modules in privileged zone 130 and standard zone 132 but requires specific authorization to access any interfaces of modules in trusted zone 126 and SP zone 128. Any module in standard zone 132 is able to access interfaces for other modules in standard zone 132 but requires specific authorization to access any interfaces of modules in trusted zone 126, SP zone 128 and privileged zone 130.

Illustrated within zones 126, 128, 130 and 132 are exemplary code modules. A first module, or "mod_1," 134 and a second module, or "mod_2," 136 are within trusted zone 126. A third module, or "mod_3," 138 is within SP zone 128, a fourth module, or "mod_4," 140 is within privileged zone 132 and a fifth module, or "mod_5," 142 is within standard zone 132.

Authorized code in standard zone 132, such as mod_5 142, is able to access particular programming modules within trusted zone 126, such as mod_1 134, by means of an exemplary application programming interface (API) 142 provided by a particular corresponding module of trusted zone 126 for that purpose. Typically, runtime environment 120 would include multiple APIs, service provider programming interfaces (SPIs) and component programming interfaces (CPIs) but, for the sake of simplicity, FIG. 2 only illustrates a few representative APIs, SPIs and CPIs.

Another type of possible interfaces is an internal interface (not shown). An internal interface is typically employed entirely within a particular module although there may be some circumstances when an internal interface is exposed to other modules, both within the same security zone and outside of that zone.

Also shown are an API 144 for providing to modules in standard zone 132 access to particular corresponding module in SP zone 128, an API 146 for providing to standard zone 132 modules access to a particular corresponding module of trusted zone 126 and an API 148 for providing to modules of standard zone 132 access to a particular corresponding module of SP zone 128. In other words, specific APIs are visible to designated modules of standard zone 132 and privileged zone 130 to provide access to specific modules in SP zone 128 and trusted zone 126. A particular API that is exported to a specific zone is automatically exported to zones with privileged level higher than the specific zone. For example, the J2EE programming interface is exported to the standard zone. Code in the privileged zone automatically has access to the J2EE programming interface because privileges zone is at a higher security level than standard zone.

Modules of SP zone 128, such as mod_3 138, are able to access particular modules of trusted zone 126, such as mod_1 134 and mod_2 136, via service SPIs, such as a SPI 150. Modules within the same security zone are able to access each other by means of component programming interfaces (CPIs), such as a CPI 152, a CPI 154 and a CPI 156. For example, mod_1 134 is able to access mod_2 136 by means of CPI 156 provided by mod_2 136. Mod_2 136 is able to access mod_1 134 by means of CPI 154 provided by mod_1 134. Similarly, mod_3 138 is accessed by other modules (not shown) within SP zone 128 via a CPI 152. A CPI is useful for defining internal programming interfaces. Modules can expose internal programming interface to other modules in the same zone by declaring those programming interfaces as CPIs.

According to one embodiment of the claimed subject matter, exporting and importing programming interfaces to and from an anchor module is one way to declare the target zone for a module. Examples of anchor modules are a SP anchor module 158 corresponding to SP zone 128 and a trusted anchor module 160 corresponding to trusted zone 126. By declaring import from and export to CPIs of trusted zone anchor module 160, mod_1 134 and mod_2 136 are installed into trusted zone 126. Consequently mod_1 134 and mod_2 136 can access CPIs of each other. In FIG. 2, mod_3 138 by default is not allowed access to mod_1 134 and/or mod_2 136 CPIs within trusted zone 126 because mod_3 imports from and exports to the SP anchor 158.

Mod_1 134, mod_2 136 and any other programming modules (not shown) of trusted code 126 access other modules of trusted code 126 via corresponding CPIs without a need to access via trusted anchor 160. In other words, anchors such as SP anchor 158 and trusted anchor 160 provide CPI access to authorized modules within their own security zones 128 and 126, respectively. Techniques for authorizing modules to access specific APIs, SPIs and CPIs is described in more detail below in conjunction with FIGS. 3-6.

In the described embodiment, a logical module is created at each privilege level as an anchor point as a way to define the privilege level. For example, trusted anchor 160 is created at the trusted zone, or privilege level, 126. Any module that declares in an IMPORT command the CPI interface of trusted anchor 160 and is also declared in the EXPORT command of trusted anchor 160 implicitly belongs to trusted privilege level 126. Similarly, SP anchor 158 is created to anchor the service provider privilege level. Any module that declares in an IMPORT command the CPI interface of SP anchor 158 implicitly belongs to SP level 128, provided that the module is declared in an EXPORT command of SP anchor 158. This approach alleviates the need to create a "trusted" tag to indicate the privilege level of a module. The IMPORT command is described in more detail below in conjunction with FIG. 3.

Figure 3:
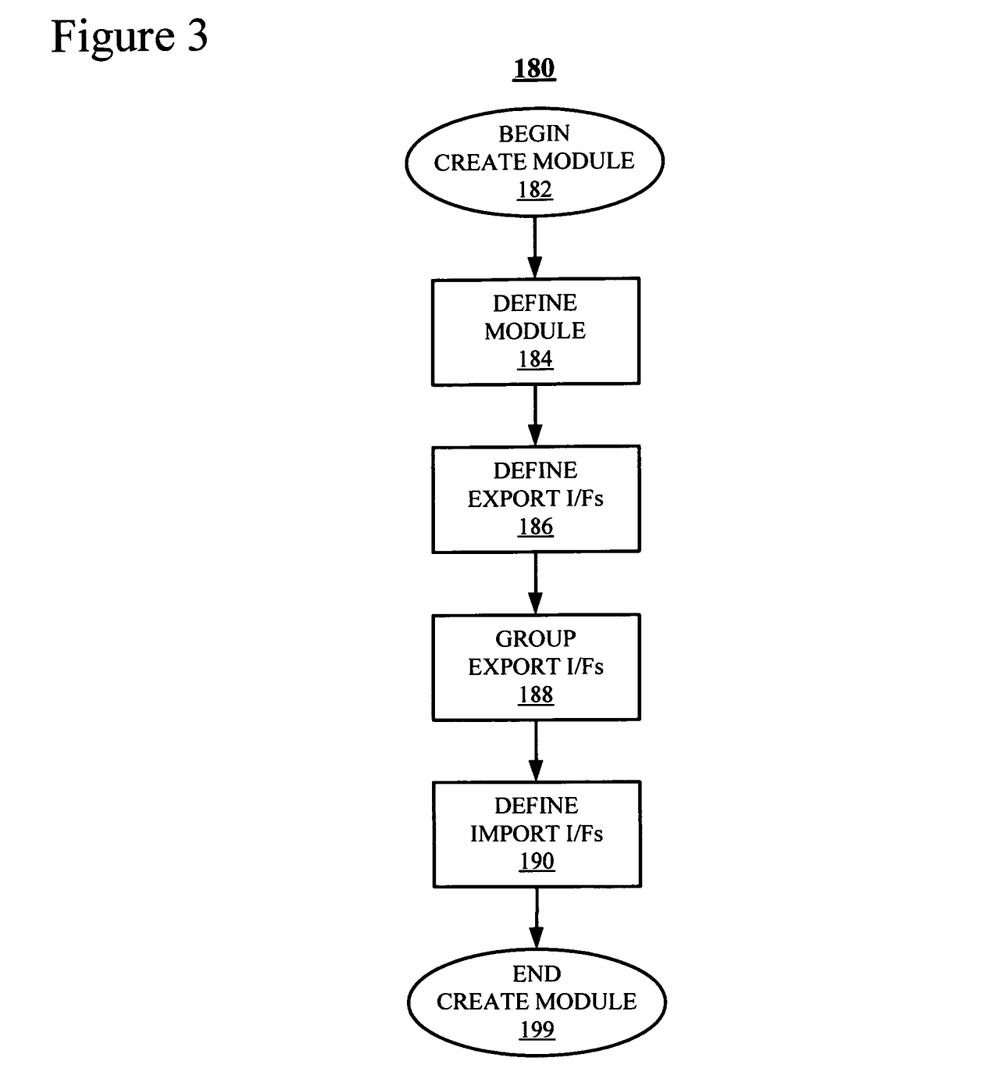
FIG. 3 is a flow chart of a Create Module process for creating a programming class in conformity with the claimed subject matter.

FIG. 3 is a flow chart of a Create Module process 180 for creating a programming class in conformity with the claimed subject matter. Process starts in a "Begin Create Module" block 182 and control proceeds immediately to a "Define Module" block 184. During block 184, programming code module is developed and organized according to techniques that should be familiar to those in the computing arts. During a "Define Export Interfaces (I/Fs)" block 186, a developer categorizes module interfaces as APIs, SPIs, CPIs or internal interfaces for the module created during block 184. A module is also categorized into one of three privileged levels: trusted zone 126 (FIG. 2), SP zone 128 (FIG. 2) or privileged zone 130 (FIG. 2). Modules in trusted zone 126 can access all the interfaces exposed by other modules provided that the module and the classes in that module is in its class path. SPI interfaces typically are exported to SP zone 128, i.e., modules that are at the same privileged level as SP anchor 158 (FIG. 2).

Each API interface in exported to a specific zone. An API exported to SP zone 128 by default can only be accessed by modules in SP zone 128 and trusted zone 126. APIs export to privileged zone 130 can be accessed by modules in privileged zone 130 as well as by modules in SP zone 128 and trusted zone 126. APIs exported to standard zone 132 (FIG. 2) can be accessed by modules in all four zones 126, 128, 130 and 132. Modules in a less privileged zone can access APIs exported to a higher privileges zone provided that explicit export policy is defined to allow such an access. Modules in SP zone 128 can access the API and SPI interfaces exported to SP zone 128 by modules in trust zone 126 but not the trusted zone 126 CPI interfaces. Modules in privileged zone 130 typically can access the API interfaces exported to privileged zone 130 by modules in trusted zone 126 and SP zone 128, but not the SPI and CPI interfaces of modules in trusted zone 126 and SP zone 128.

Through the module export policy, a class loader can enforce access control to WAS functions once at module loading and at class loading time. This capability should compare very favorably in terms of performance to the Java2 permission checking which is typically enforced at method invocation time for every invocation.

During a "Group Export I/Fs" block 188, the developer determines the modules and their respective zones that will require access to the APIs, CPIs and internal interfaces defined during block 186. APIs, SPIs and CPIs are declared as part of a particular group by means of the EXPORT command. The claimed subject matter provides a mechanism for including as part of the EXPORT command the capability of defining the particular category to which each interface belongs, i.e. API, SPI or CPI. By default, any interface not specifically declared as an API, SPI or CPI is assumed to be an interface to a method that is strictly for the internal use of the module.

Additionally a module can use "named" EXPORT to expose particular interfaces to selected modules. In other words, legacy applications and legacy service provider code may have accessed programming interfaces that were not meant for them to use. When WAS enforces the disclosed modular based access control, the default interface export policy will no longer allow the legacy code and applications to access those interface. The named EXPORT mechanism allows a module at a higher privileged level to expose specific API, SPI, and CPI interfaces to the named module at a lower privileged level. Named EXPORT can avoid the problem of expose sensitive interfaces to all modules at a lower privileged level. For example, the developer, while creating mod_1 134 (FIG. 2) during block 182, may determine that mod_4 140 (FIG. 2) will need to access CPI 154 (FIG. 2), which is defined during block 184, which corresponds to mod_1 134. In this example, a rule may be added to the module that contains the specified CPI 154 to expose the CPI to mod_4 140 in privileged zone 130 (FIG. 2). Information created during block 186 may be, depending upon the particular implementation, either stored internally in the module or saved in policy file 112 (FIG. 1). By using named EXPORT, a component can also be designed to have multiple modules at different privilege levels.

During a "Define Import I/Fs" block 190, the module defined during block 184, declares dependencies upon other modules or, in other words, specifies using an "IMPORT" command, other modules interfaces that will be necessary to access during execution or the module. Whether or not a particular interface actually exists or a particular module is authorized to access a declared interface is determined at installation time, which is described in more detail below in conjunction with FIG. 4.

Create Module process 180 may fail during module installation if a new module declares one or more interfaces in the new modules IMPORT policy that are not declared in the EXPORT policy or policies of the module or modules that the new module is dependant upon and the IT administrator has decided not to change the other module or modules' EXPORT policy. Note that this mechanism provide better protection to the interfaces in that interface access control is determined both by the IMPORT policy of a requesting module as well as by the EXPORT policy of the target module.

In summary, the EXPORT policy defines interfaces a module wants to expose to other modules. The IMPORT policy defines the interfaces of other modules a module need to use. A module is allowed to access an interface of another module when it specifies the external in its own IMPORT policy and the other module defines it in its EXPORT policy. The EXPORT policy can be implicit via the API, SPI, and CPI grouping rules of privileged levels or explicit via the named EXPORT policy.

Finally, in an "End Create Module" block 199, process 180 is complete. The described approach improves system usability. A new application must declare IMPORTs in its modules. When the application is deployed into an environment such as WebSphere Application Server, the deployment tool can inform the administrator which privilege level the application would need to be placed at. The concept of the four privilege levels are very easy to be understood compared to the list of granted permissions in a standard "WAS.policy" file.

Figure 4:
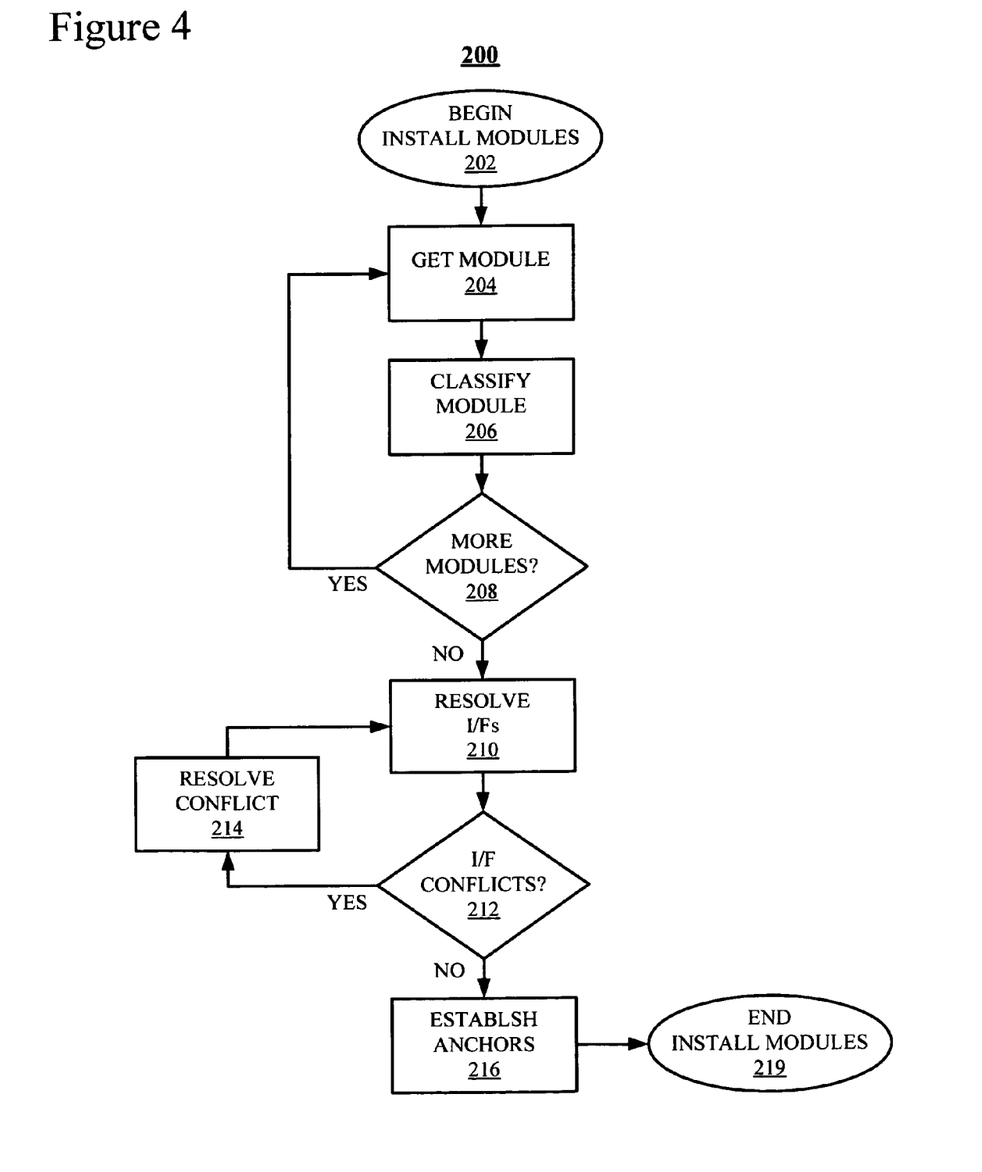
FIG. 4 is a flowchart of an Install Modules process for deploying programming modules created as described above in conjunction with FIG. 3.

FIG. 4 is a flowchart of an Install Modules process 200 for creating a loadable runtime system such as runtime system 120 illustrated above in conjunction with FIG. 2. Process 200 starts in a "Begin Install Modules" block 202 and control proceeds immediately to a "Get Module" block 204. During block 204, process 200 selects a module to process. A typical system 102 includes multiple modules which are process or install into runtime system 102 one at a time. During a "Classify Module" block 206, process 200 determines the appropriate package in which to place the module selected for processing during block 204 and designates the appropriate security zone 126, 128, 130 or 132 (FIG. 2) in which to place the module. The information to enable process 200 to make these determinations is stored in policy file 112 (FIG. 1). In addition, process 200 notes for the purposes of subsequent blocks the particular classifications of methods within the target module. In other words at this point, the classification defined during Define Export I/Fs block 186 (FIG. 3) as to whether a particular interface is an API, SPI, CPI or strictly an interface to the module are noted and stored in policy file 112.

During a "More Modules?" block 208, process 200 determines whether or not there are additional modules that need to be installed in runtime system 102. If so, process 200 returns to Get Module block 204, gets the next unprocessed module and processing continues as described above. If not, control proceeds to a "Resolve I/Fs" block 210. As mentioned above, a typical runtime system such as runtime system 102 would include many modules.

During Resolve I/Fs block 210, process 200 checks the information relating to each module's EXPORT I/Fs against each modules" IMPORT I/Fs to determine whether or not 1) each declared I/F actually exists; and 2) each IMPORT interface is associated with a module that either has the authority to access the interface of has been named in conjunction with a Named EXPORT designation. During an "I/F Conflicts?" block 212, process 200 determines whether or not all interface declarations were resolved during block 210. If so, process 200 proceeds to an "Establish Anchors" block 216 during which process 200 generates trusted anchor 160 (FIG. 2) and SP anchor 158 (FIG. 2) and stores information relating to trusted anchor 160 and SP anchor 158 in policy file 112. Control then proceeds to an "End Install Modules" block 219 in which process 200 is complete.

If during block 212 process 200 determines that interface conflict exist, then control proceeds to a "Resolve Conflicts" block 214 during which the conflicts are resolved. An exemplary process corresponding to block 214 is described below in conjunction with FIG. 6. Typically, a system administrator would use a graphical user interface (GUI) to either change or add interface definitions or add modules to runtime system 102 to resolve the conflicts. Of course, any resolution might create other resolution issues, requiring process 200 to make several iterations through blocks 210, 212 and 214. Process 200 then returns to Resolve I/Fs block 210 and processing continues as described above. Further, this description does not address procedures for the situation in which there is no apparent resolution with respect to the interfaces. In that case, process 200 may be aborted until a solution is developed. When a module specifies in its IMPORT policy an interface of a module at a higher privileged level and that interface was not defined by the EXPORT policy of the other module, the IT administrator will be notified. The IT administrator can resolve this conflict by defining a named EXPORT policy to expose the specified interface to the first module.

Figure 5:
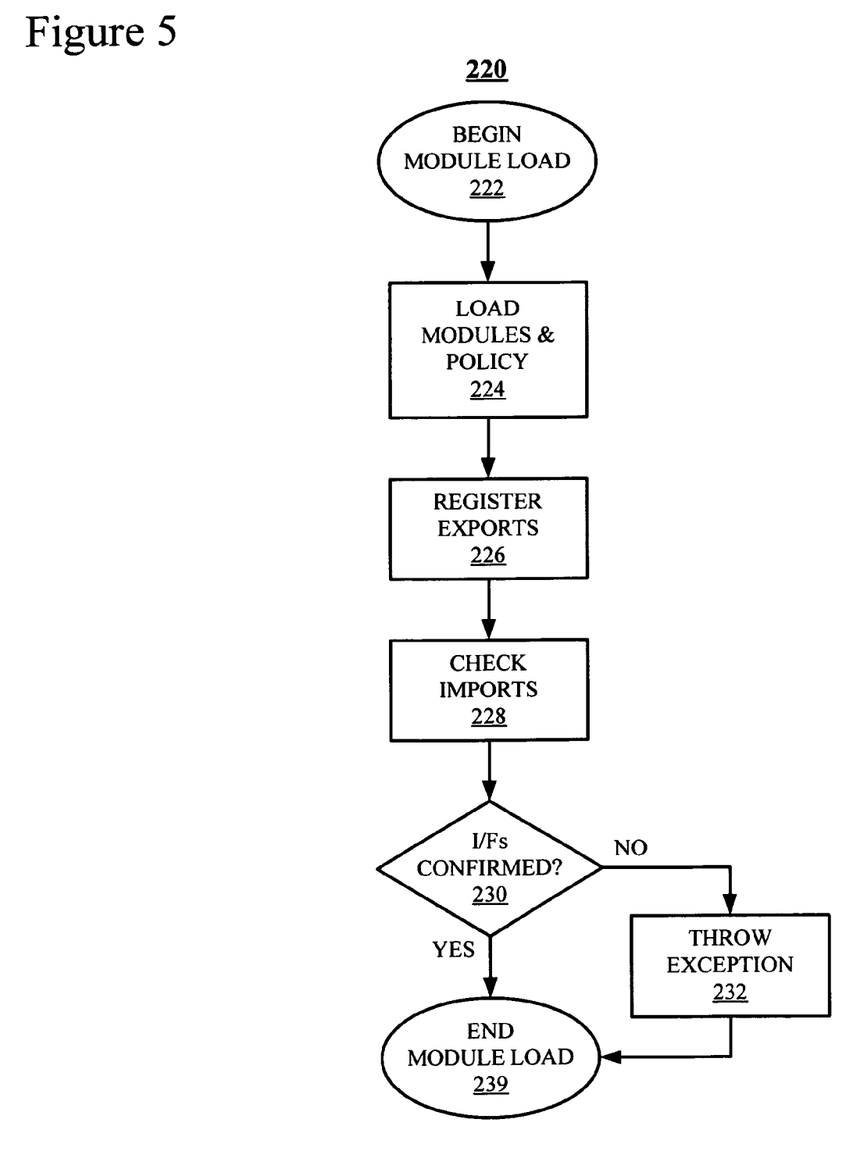
FIG. 5 is a flowchart of a Module Load process for loading a programming module created as described in conjunction with FIG. 3 and installed as described above in conjunction with FIG. 4.

FIG. 5 is a flowchart of a Module Load process 220 for loading a programming module created and installed as described in conjunction with processes 180 and 200 of FIGS. 3 and 4, respectively. It should be noted that process 220 describes a runtime class loader and not a user class loader. Process 220 starts in a "Begin Module Load" block 222 and control proceeds immediately to a "Load Modules and Policy" block 224. During block 224, process 220 loads into runtime system 120 (FIG. 2) and computing system 102 (FIG. 1) the modules created in accordance with process 180 (FIG. 3) and installed in accordance with process 200 (FIG. 4). Also loaded is the information stored in policy file 112 (FIG. 1).

During a "Register Exports" block 226, process 220 transmits to appropriate anchors, such as SP anchor 158 (FIG. 2) and trusted anchor 160 (FIG. 2) information in the modules and policy file 112 loaded during block 224. This information includes data about interfaces that are available as the result of the loading of any particular module and the specific zones or modules that are able to access those interfaces. During a "Check Imports" block 228, process 220 cross references interfaces listed in IMPORT declarations against the interfaces registered during block 226 as the result of EXPORT declarations and policy file 112. In other words, if a particular module declares a particular interface in an IMPORT command, process 220 needs to check that both the module corresponding to the interface is loaded but that the requesting module is authorized to access the interface, either because of the requesting module's zone or because of a named EXPORT command.

During an "I/Fs Confirmed" block 230, process 220 determines whether or not all interfaces declared during block 228 are resolved with respect to I/Fs declared during block 226. Typically, all I/F resolution issues would have been resolved during Resolve I/Fs block 210 (FIG. 4), I/F conflicts block 212 (FIG. 4) and Resolve conflict block 214 (FIG. 4) of process 200 (FIG. 4). The actions taken during process 220 represent one additional pre-runtime check that enable the claimed subject matter to detect and, if desired, integrate legacy applications. If during block 230 process 220 determines that all I/F issues are not resolved, then process 220 proceeds to a "Throw Exception" block 232 during which process 220 takes whatever action the developer programmed the system. In one embodiment, to take under the transmitted message takes the form of a graphical user interface (GUI) (not shown) that is displayed on monitor 104 (FIG. 1) that enables the notified user to take corrective action.

This specification does not specify the type of action that may be taken or how process 220 is notified of any action. A typical action may be to generate an audit record to log the error condition and the failure of the class loading. Alternatively, a system administrator notified during block 232 has elected to invoke a Modify Policy process 260 (see FIG. 6).

If during block 230, process 220 determines that all I/Fs are confirmed, control proceeds to an "End Module Load" block 239 in which process 220 is complete. Note that checking whether an interface can be accessed by a class and module is handled during module loading and class loading time rather than at runtime. In other words, there is no additional permission checking at class execution time and hence improved access. According to the claimed subject matter, unauthorized I/F requests are blocked by simply not providing the requested Import information. In effect, a targeted export I/F is invisible to an unauthorized import I/F. Typically, a request to access such an import interface would result in an exception being thrown during runtime. I/Fs handled in this manner do not need to execute permission checking during runtime because inappropriate I/F request are impossible to execute. This feature improves runtime performance.

Figure 6:
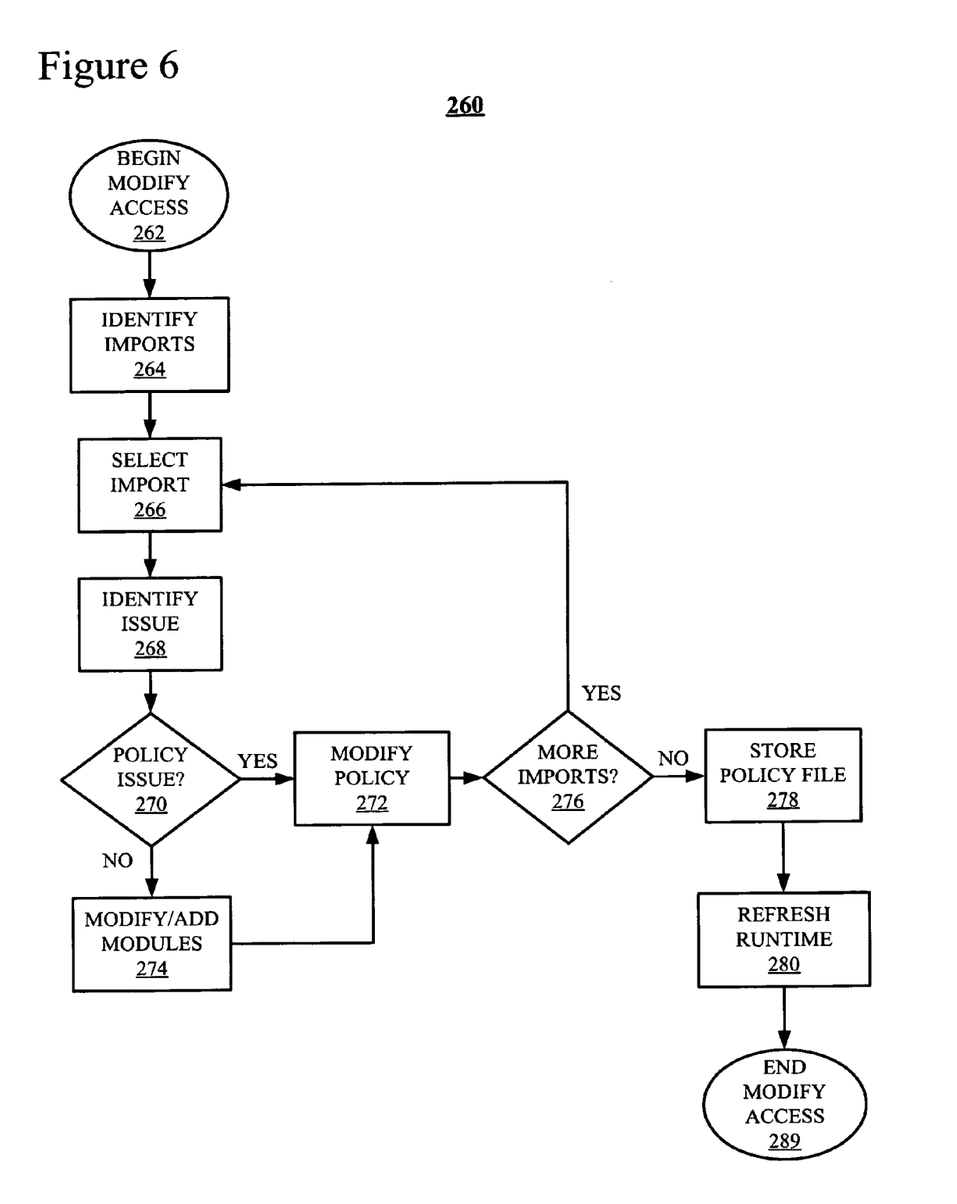
FIG. 6 is a flowchart of a Modify Access process for enabling legacy applications to execute within the runtime system of FIG. 2.

FIG. 6 is a flowchart of Modify Access process 260 for resolving interface conflicts during Install Modules process 200 (FIG. 4), including I/F conflicts presented by legacy applications executing in runtime system 120 of FIG. 2. Process 260 may also be activated in response to a tool (not shown) that performs a scan of runtime system 102 (FIG. 2) to analyze modules, both those created in conformance with Create Module process 180 (FIG. 3) and modules that are associated with legacy applications. One method of performing such a scan is to employ a Java byte code analysis.

Process 260 starts in a "Begin Modify Access" block 262 and control proceeds immediately to an "Identify Imports" block 264. During block 264, process 260 identifies problematic access requests discovered during Check Imports block 228 of Module Load process 220, described above in conjunction with FIG. 5. As explained above, a problematic I/Fs discovered during block 228 can be the result of a particular module that declares a particular interface in an IMPORT command but either the module corresponding to the interface is not loaded or the requesting module is not authorized to access the interface. Another potential source of a problematic access request is the result of a scan process that pairs module access requests from legacy applications to EXPORT declarations of modules that conform to the provided security system.

During a "Select Import" block 266 during which process 260 selects one of the problematic access request for resolution. During an "Identify Issue" block 268, process 260 determines whether the access request corresponds to an existing I/F declared in an EXPORT command described above in conjunction with FIG. 3 or a non-existent I/F. During a "Policy Issue?" block 270, the user determines whether or not the issue identified during block 268 is something that can be addressed by modify the I/F policy as articulated in police file 112. If so, during a "Modify Policy" block 272, process 260 make the necessary adjustments to policy file 112.

Adjustments can be changes such as, but not limited to, redefining the categories of a particular I/F. In other words, if module in SP zone 128 (FIG. 2) cannot access a particular CPI I/F in trusted zone 126 (FIG. 2), then the user, employing the GUI and process 260, may reclassify the particular I/F as an SPI, thus enabling the SP zone 128 module permission to access the I/F. Of course, a reclassification of an I/F from CPI to SPI would also enable any module in SP zone 128 to access the I/F and this may not be the intention of the user. The GUI provides the user with various options. Another viable option may be to create a Named EXPORT that enables the particular CPI to be accessed by the specific SP zone 128 module and only the specific module within SP zone 128. In this scenario, the named export is declared in policy file 112 rather than in the target module and implemented via trusted anchor 160. Those with skill in the art should appreciate that a named EXPORT policy can be stored in places other than policy file 112.

If during block 270, the user determines that the issue identified during block 268 requires a module change or addition rather than a policy file 112 modification, process 260 proceeds to a "Modify/Add Modules" block 276. During block 274, the GUI and process 260 enables the user to manipulate EXPORT commands of target modules or to incorporate an additional module in runtime system 120 to resolve the identified issue. Once the issue has been addressed, process 260 proceeds to Modify Policy block 272 described above during which any necessary modification in policy file 112 are performed.

During a "More Imports?" block 276, process 260 determines whether or not all the import issues identified during block 268 have been addressed. If not, process 260 returns to Select Imports block 266 during which the next unresolved import issue is selected and processing continues as described above. If, during block 276, process 260 determines that all import issues have been resolved, then control proceeds to a "Store Policy File" block 278 during which process stores modified policy file 112 in data storage 110 (FIG. 1). Once policy file 112 is updated, process 260 proceeds to a "Refresh Runtime" block 280, which corresponds to Install Modules process 200 described above in conjunction with FIG. 4. Of course, it may also be necessary to also execute Module Load process 220 again as well. In an alternative embodiment, only modules that need to be modified are reinstalled and reloaded. Finally, during an "End Modify Access" block 289, process 260 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for enforcing programming module security, comprising:
   defining a plurality of logic classes corresponding to a runtime environment executed on a processor;
   defining a plurality of security zones, each security zone corresponding to a particular logic class of the plurality of logic classes, wherein the security zones are ranked from high security to low security;
   associating a plurality of programming modules to the plurality of logic classes by assigning each programming modules to one of the plurality of logic classes:
   determining a security zone of a particular module when the particular module is loaded on the processor by associating the security zone of the module with the security zone corresponding to the assigned logic, class of the module;
   enabling a first module of the plurality of modules to access an interface associated with a second module of the plurality of modules wherein the security zone of the logic class associated with the first module is at least equal to the security zone of logic class associated with the second module;
   establishing an anchor module and associating the anchor module with the logic zone associated with the first module;
   granting to the second module access to a component programming interface (CPI) to the anchor;
   granting to the anchor module access to a CPI of the second module; and
   enabling the second module to access a CPI of a third module in the logic zone associated with the anchor module by virtue. of the second module's access to the CPI of the anchor and the anchor's access to the CPI of the second module.

2. The method of claim 1, further comprising:
   authorizing an interface from the second module to the first module; and
   enabling,. in response to the authorizing, the second module to access an interface of the first module to a third module, wherein the security zone of the logic class associated with the second module is less than a security zone of logic class associated h the third module.

3. The method of claim 2, wherein the authorization is implemented by means of a named EXPORT command in the first module.

4. The method of claim 1, wherein the second module is in the security zone of the anchor module virtue of the second module's access to the CPI of the anchor and the anchors access to the CPI of the second module.

5. The method of claim 1, wherein security zones and an assignment of modules to the security zones are defined by means of a policy file.

6. The method of claim 1 wherein the methods is executed on a Java Virtual Machine (JVM).

7. A system for enforcing programming module security, comprising:
   a processor;
   a memory coupled to the processor;
   a plurality of logic classes corresponding to a runtime environment;
   an anchor module;
   a plurality of security zones, each security zone corresponding to a particular logic class of the plurality of logic classes, wherein the security zones are ranked from high security to low security; and
   logic, stored on the memory and executed on the processor, for;

associating a plurality of programming modules to the plurality of logic classes by assigning each programming modules to one of the plurality of logic classes;

determining a security zone of a particular module at a load time of the module by associating the security zone of the module with the security zone corresponding to the assigned logic class of the module;

enabling a first module of the plurality of modules to access an interface associated with a second module of the plurality of modules if the security zone of the logic class associated with the first module is at least equal to the security zone of logic class associated with the second module;

associating the anchor module with the logic zone associated with the first module:

granting to the second module access to a component programming interface (CPI) of the anchor;

granting to the anchor module access to a CPI of the second module; and enabling the second module to access a CPI of a third module in the logic zone associated with the first module by virtue of the second module's access to the CPI of the anchor and the anchor module's access to the CPI of the second module.

8. The system of claim 7, the logic further comprising logic for;

authorizing an interface from the second module to the first module; and enabling, in response to the authorizing, the second module to access an interface of the first module to a third module, wherein the security zone of the logic class associated with the second module is less than a security zone of logic class associated with the third module.

9. The system of claim 8, wherein the authorization is implemented by means of a named EXPORT command in the first module.

10. The system of claim 7, wherein the second module is in the security zone of the anchor module virtue of the second module's access to the CPI of the anchor and the anchor's access to the CPI of the second module.

11. The system of claim 7, further comprising a policy file for defining security zones and an assignment of modules to the security zones.

12. The system of claim 7, wherein the system is executed on a Java Virtual Machine (JVM).

13. A computer programming product for enforcing programming module security comprising:

a memory;

logic, stored on the memory for execution on a processor, for;

defining a plurality of logic classes corresponding to a runtime environment;

defining a plurality of security zones, each security zone corresponding to a particular logic class of the plurality of logic classes, wherein the security zones are ranked from high security to low security:

associating a plurality of programming modules to the plurality of logic classes by assigning each programming modules to one of the plurality of logic classes;

determining a security zone of a particular module at a load time of the module by associating the security zone of the module with the security zone corresponding to the assigned logic class of the module;

enabling a first module of the plurality of modules to access an interface associated with a second module of the plurality of modules if the security zone of the logic class associated with the first module is at least equal to the security zone of logic class associated with the second module;

establishing an anchor module and associating the anchor module with the logic zone associated with the first module;

granting to the second module access to a component programming interface (CPI) of the anchor;

granting to the anchor module access to a CPI of the second module; and enabling the second module to access an interface of a third module in the logic zone associated with the first module by virtue of the second module's access to the CPI of the anchor and the anchor's access to the CPI of the second module.

14. The computer programming product of claim 13, further comprising logic, stored on the memory for execution on the processor for:

authorizing an interface from the second module to the first module; and enabling, in response to the authorizing, the second module to access an interface of the first module to a third module, wherein the security zone of the logic class associated with the second module is less than a security zone of logic class associated with the third module.

15. The computer programming product of claim 14, wherein the authorization is implemented by means of as named EXPORT command in the first module.

16. The computer programming product of claim 13, wherein the second module is in the security zone of the anchor module virtue of the second module's access to the CPI of the anchor and the anchor's access to the CPI of the second module.

17. The computer programming product of claim 13, further comprising a policy file, stored on the memory, for defining security zones and an assignment of modules to the security zones.

* * * * *